(12) United States Patent
Tatsumoto et al.

(10) Patent No.: US 12,543,880 B2
(45) Date of Patent: Feb. 10, 2026

(54) DELIVERY LOCKER MANAGEMENT SYSTEM

(71) Applicant: TOYOTA JIDOSHA KABUSHIKI KAISHA, Toyota (JP)

(72) Inventors: Yuki Tatsumoto, Seto (JP); Ryutaro Tomita, Tokyo (JP); Mami Noguchi, Nagoya (JP); Kenichiro Sugihara, Kounosu (JP); Hiroyuki Nakajima, Tokyo (JP); Yuko Nagai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/663,280

(22) Filed: May 14, 2024

(65) Prior Publication Data
US 2024/0382028 A1    Nov. 21, 2024

(30) Foreign Application Priority Data
May 18, 2023   (JP) ................. 2023-082197

(51) Int. Cl.
*A47G 29/14* (2006.01)
*A47G 29/30* (2006.01)

(52) U.S. Cl.
CPC ........... *A47G 29/141* (2013.01); *A47G 29/30* (2013.01); *A47G 2029/142* (2013.01); *A47G 2029/149* (2013.01)

(58) Field of Classification Search
CPC .. A47G 29/141; A47G 29/30; A47G 29/1201; A47G 2029/142; A47G 2029/143; A47G 2029/145; A47G 2029/146; A47G 2029/149; G06Q 10/0836; G06Q 10/083; G06Q 10/02; G07F 17/12; G07F 17/13
See application file for complete search history.

(56) References Cited

U.S. PATENT DOCUMENTS

| | | | |
|---|---|---|---|
| 9,504,344 B2 * | 11/2016 | Sarvestani | A47G 29/1201 |
| 9,745,130 B1 * | 8/2017 | Rawal | G06Q 10/0875 |
| 10,624,484 B1 * | 4/2020 | Mountford | B60P 3/03 |
| 10,808,449 B1 * | 10/2020 | Goetz | E05G 7/00 |
| 10,888,189 B2 * | 1/2021 | Pointeau | G06Q 10/08 |
| 11,191,382 B2 * | 12/2021 | Likins | A47G 29/1201 |
| 11,410,118 B2 * | 8/2022 | Fee | G07C 9/00896 |
| 12,280,913 B2 * | 4/2025 | Gil | B64D 9/00 |

(Continued)

FOREIGN PATENT DOCUMENTS

| | | |
|---|---|---|
| JP | 2589581 | 12/1996 |
| JP | 2004-30159 A | 1/2004 |

(Continued)

*Primary Examiner* — William L Miller
(74) *Attorney, Agent, or Firm* — Oblon, McClelland, Maier & Neustadt, L.L.P.

(57) ABSTRACT

A delivery locker management system includes a delivery locker station including multiple delivery lockers having two or more different sizes, and a server that communicates with the delivery locker station. The server obtains information on a size of a parcel to be deposited. The server extracts delivery lockers having sizes suitable for the parcel from available delivery lockers among the multiple delivery lockers. The server allocates one of the extracted delivery lockers to the parcel. The server notifies a depositor of the parcel of information identifying the delivery locker allocated to the parcel.

5 Claims, 6 Drawing Sheets

(56) References Cited

U.S. PATENT DOCUMENTS

| | | | | |
|---|---|---|---|---|
| 12,324,534 B2* | 6/2025 | Musaed | ............ | G06Q 10/0836 |
| 2002/0130172 A1* | 9/2002 | Hara | .................... | A47G 29/141 |
| | | | | 232/18 |
| 2010/0026452 A1* | 2/2010 | Wilms | .................... | G07C 9/27 |
| | | | | 340/5.73 |
| 2012/0326840 A1* | 12/2012 | Frankenberg | ........... | G07F 17/13 |
| | | | | 340/5.65 |
| 2013/0264381 A1* | 10/2013 | Kim | ........................ | G07F 17/13 |
| | | | | 232/24 |
| 2015/0371187 A1* | 12/2015 | Irwin | ................ | G06Q 10/0836 |
| | | | | 705/72 |
| 2016/0066732 A1* | 3/2016 | Sarvestani | ........... | A47G 29/141 |
| | | | | 232/24 |
| 2019/0231105 A1* | 8/2019 | Pointeau | ............ | G07C 9/00896 |
| 2019/0370744 A1* | 12/2019 | Fee | ...................... | G07G 1/0063 |
| 2020/0293990 A1* | 9/2020 | Mak | .................. | G06K 7/10366 |
| 2021/0065072 A1* | 3/2021 | Tatsumoto | .............. | H04W 4/42 |
| 2021/0370988 A1* | 12/2021 | Cheng | .................... | B60P 3/007 |
| 2024/0108133 A1* | 4/2024 | Chang | .................... | G07F 17/13 |
| 2024/0268590 A1* | 8/2024 | Musaed | ............. | G06Q 10/0836 |
| 2024/0349924 A1* | 10/2024 | Issack | .................... | A47G 29/30 |
| 2025/0148857 A1* | 5/2025 | Ecton | ...................... | G07F 17/13 |
| 2025/0252806 A1* | 8/2025 | Pointeau | ................ | G07F 17/13 |
| 2025/0255425 A1* | 8/2025 | Sato | .................... | A47G 29/141 |

FOREIGN PATENT DOCUMENTS

| | | | | |
|---|---|---|---|---|
| JP | 2019-37389 | 3/2019 | | |
| JP | 2021-22249 | 2/2021 | | |
| WO | WO-2024188826 A1 * | 9/2024 | ............. | G06N 20/00 |

* cited by examiner

DELIVERY LOCKER MANAGEMENT SYSTEM

RELATED APPLICATION

The present application claims priority of Japanese Patent Application No. 2023-082197 filed on May 18, 2023, the disclosure of which is hereby incorporated by reference herein in its entirety.

BACKGROUND

1. Field

The present disclosure relates to a delivery locker management system.

2. Description of Related Art

Japanese Laid-Open Patent Publication No. 2004-030159 discloses a delivery locker reservation system. The delivery locker reservation system includes multiple delivery locker stations and a management center that manages the delivery locker stations via a communication network. Each delivery locker station includes multiple delivery lockers. A user who wishes to use a delivery locker can make a reservation for a delivery locker through accessing the management center. The user is, for example, a delivery person of a delivery service.

The management center is capable of determining whether each delivery locker is in use. At the moment a user attempts to reserve a delivery locker within a specific delivery locker station, it is possible that all the delivery lockers in the delivery locker station are occupied. In such cases, after accepting the reservation, the management center will lock an available delivery locker as soon as it becomes vacant and notify the user that the delivery locker is now available for use.

A single delivery locker station may include multiple delivery lockers having different sizes. For instance, the delivery lockers are categorized into two sizes: large and small. Despite the availability of small delivery lockers, a parcel that would fit into a small delivery locker is sometimes placed in a large delivery locker. As a result, the large delivery lockers quickly become filled, and large parcels that cannot fit into the small delivery lockers can no longer be deposited.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a delivery locker management system includes a delivery locker station including multiple delivery lockers having two or more different sizes, and a processor configured to communicate with the delivery locker station. The processor is configured to obtain information on a size of a parcel to be deposited, extract delivery lockers having sizes suitable for the parcel from available delivery lockers among the multiple delivery lockers, allocate one of the extracted delivery lockers to the parcel, notify a depositor of the parcel of information identifying the delivery locker allocated to the parcel, and unlock the delivery locker allocated to the parcel, so that the depositor can deposit the parcel in the delivery locker allocated to the parcel.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, a delivery locker management system according to an embodiment will be described with reference to the drawings.

Overall Configuration

Figure 1:
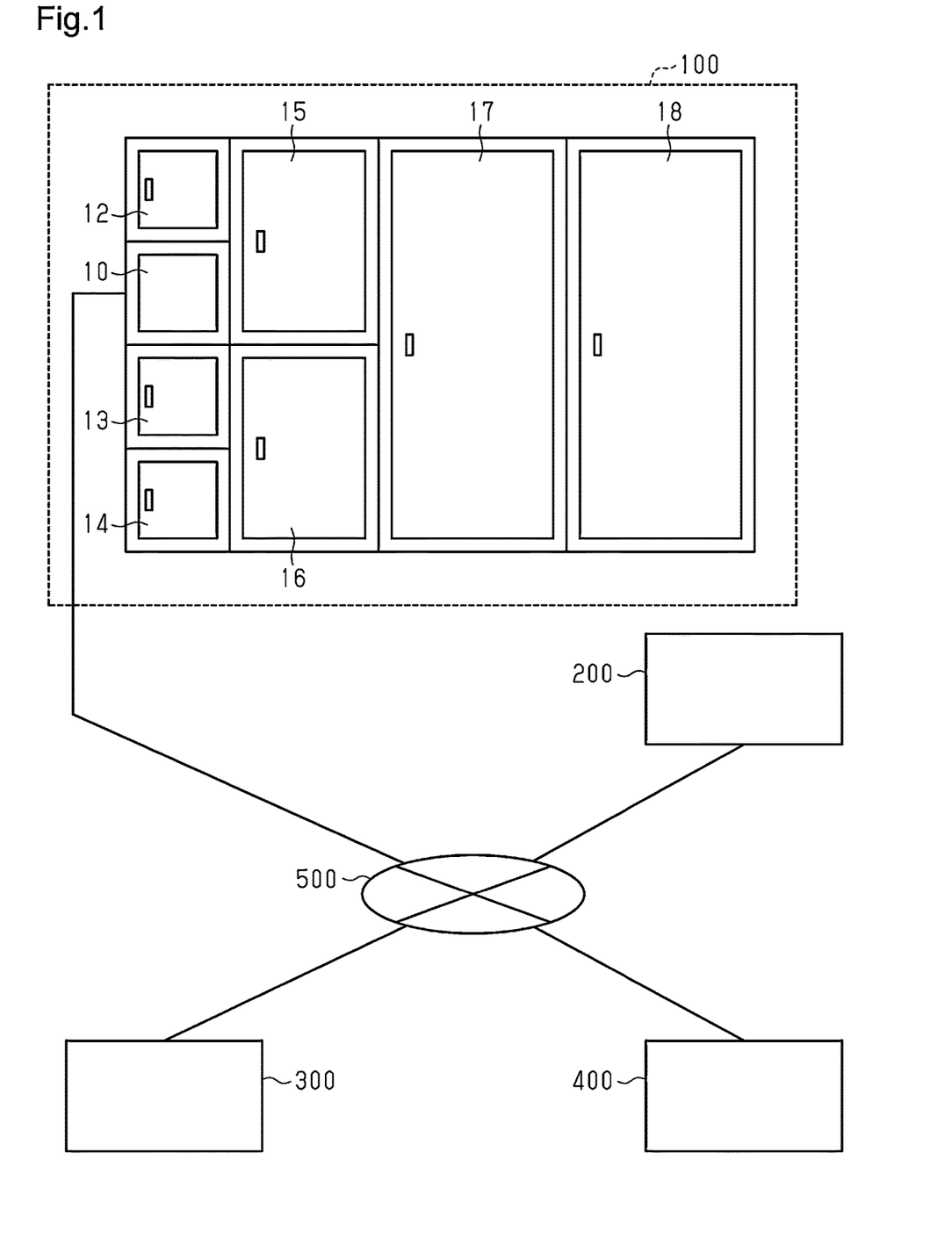
FIG. 1 is a diagram illustrating a delivery locker management system according to an embodiment, which communicates with a depositor and a recipient via a network.

FIG. 1 illustrates a delivery locker management system according to an embodiment that communicates with a depositor 300 and a recipient 400 via a network 500. The depositor 300 and the recipient 400 each have a computer with communication capabilities. The delivery locker management system includes a delivery locker station 100 including multiple delivery lockers 12 to 18 (hereinafter, referred to as lockers 12 to 18) having two or more different sizes. The delivery locker management system further includes a server 200 configured to communicate with the delivery locker station 100. The delivery locker station 100 and the server 200 exchange information when necessary. The delivery locker station 100 is installed in, for example, an entrance hall of a multiple dwelling house. The depositor 300 is, for example, a delivery person of a home delivery company. The depositor 300 may deposit the parcel in one of the lockers 12-18. The recipient 400 is a person who receives the parcel.

The delivery locker station 100 includes a computer 10 having an input interface and an output interface. The computer 10 can communicate with a server 200 via the network 500. Each of the computer 10 and the server 200 includes a CPU, a RAM, and a ROM. Each of the computer 10 and the server 200 executes software processing. Further, the computer 10 can communicate with the lockers 12 to 18. The lockers 12 to 14 are the small lockers 12 to 14. The lockers 15 and 16 are medium lockers 15 and 16. The lockers 17 and 18 are large lockers 17 and 18.

If the depositor 300 is completely free to select an available one of the lockers 12-18, the following problem arises. For example, even though the small lockers 12 to 14 are available, there may be a case in which a parcel accommodated in one of the small lockers 12 to 14 is deposited in the large locker 17. Here, in a case in which the large locker 18 is buried, it is not possible to deposit a parcel that can be accommodated only in the large lockers 17 and 18 in the delivery locker station 100. The present inventors have focused on such a point and designed a delivery locker management system.

Process Until Parcel in Delivery Locker Station 100 is Deposited

A process executed by the delivery locker management system will be described with reference to FIG. 2. In the description with reference to FIG. 2, the parcel deposited by the depositor 300 is sized to fit within the small lockers 12-14.

As described above, the depositor 300 is, for example, a delivery person of a home delivery company. Before the depositor 300 goes to the delivery locker station 100, the delivery locker management system assigns one of the lockers 12 to 18 to the parcel of the depositor 300.

First, in step S200, server 200 receives a request for use of delivery locker station 100 including information on the size of a parcel from depositor 300. The depositor 300 determines the size of the parcel and transmits information on the size of the parcel to the server 200. Alternatively, the depositor 300 may transmit an image obtained by photographing the parcel to the server 200 so that the size of the parcel can be known. In such a case, the server 200 determines the size of the parcel based on the received image. Next, in step S202, the server 200 determines whether or not there is an available locker among the lockers 12 to 18.

In a case in which a positive determination is made in step S202 (S202: YES), the server 200 proceeds to step S204. The server 200 extracts a locker having a size suitable for the parcel to be deposited by the depositor 300 from among the lockers available in step S204. Here, "available locker" means that it is empty and has not been reserved. For example, when all of the small lockers 12 to 14 are available and the parcel deposited by the depositor 300 can be stored in the small lockers 12 to 14, the server 200 extracts the small lockers 12 to 14. That is, the server 200 is configured to extract, as lockers 12 to 14 having suitable sizes, the smallest lockers 12 to 14 into which the parcel deposited by the depositor 300 can be inserted from the available delivery lockers among the multiple lockers 12 to 18. Next, in step S206, the server 200 presents the extracted small lockers 12 to 14 to the depositor 300. The server 200 then receives a selection of a locker 12 from the parcel depositor 300 at step S208. The server 200 then assigns the selected locker 12 to the parcel to be deposited by the depositor 300 in step S210. Next, in step S212, the server 200 notifies the depositor 300 of information for specifying the locker 12 allocated to the parcel to be deposited by the depositor 300. The server 200 also notifies the depositor 300 of information necessary for unlocking the locker 12 allocated to the parcel deposited by the depositor 300. The information required to unlock the locker 12 is, for example, a personal identification number or a QR code (registered trademark).

Then, depositor 300 goes to delivery locker station 100. The depositor 300 enters the information necessary to unlock the locker 12 into the input interface of the computer 10. That is, in step S214, the delivery locker station 100 receives an instruction to unlock the locker 12 from the depositor 300. Next, in step S216, the delivery locker station 100 unlocks the locker 12. The depositor 300 then places the parcel in the locker 12 and closes the door of the locker 12. That is, in step S218, delivery locker station 100 stores the parcel in locker 12 and locks locker 12. At the same time, the delivery locker station 100 notifies the server 200 of the fact that the delivery locker station 100 has accommodated the parcel and locked the locker 12. Next, in step S220, the server 200 notifies the recipient 400 that the parcel is stored in the locker 12. In other words, the server 200 is configured to, after the depositor 300 deposits the parcel in the locker 12, notify the recipient 400 of the parcel that the parcel has been deposited in the delivery locker station 100. Here, information necessary for unlocking the locker 12 is also notified to the recipient 400.

As described above, in the description with reference to FIG. 2, the parcel to be deposited by the depositor 300 has a size that can be accommodated in the small lockers 12 to 14. The server 200 is configured to obtain information on the size of the parcel to be deposited (step S200), extract the lockers 12 to 14 having sizes suitable for the parcel from available delivery lockers among the multiple lockers 12 to 18 (step S204), allocate one locker 12 of the extracted lockers 12 to 14 to the parcel deposited by the depositor 300 (step S210), and notify the depositor 300 of the parcel of information identifying the locker 12 allocated to the parcel (step S212). According to step S216, the computer 10 is configured to unlock the locker 12 allocated to the parcel, so that the depositor 300 can deposit the parcel in the locker 12 allocated to the parcel.

As described above, the server 200 determines whether or not there is an available locker among the lockers 12 to 18 in step S202. When a negative determination is made in Step S202 (S202: NO), the server 200 proceeds to Step S222. In step S222, the server 200 extracts a locker having a size suitable for the parcel from among the lockers 12 to 18. For example, when the parcel to be deposited by the depositor 300 is accommodated in the small lockers 12 to 14, the server 200 extracts the small lockers 12 to 14. Next, in step S224, the server 200 presents the extracted small lockers 12 to 14 to the depositor 300. The server 200 then receives a selection of a locker 12 from the parcel depositor 300 at step S226. Alternatively, the server 200 may receive a request for a small locker 12 to 14 that becomes available earliest among the small lockers 12 to 14. The server 200 then reserves the selected locker 12 for the parcel to be deposited by the depositor 300 in step S228. The server 200 then notifies the depositor 300 of information identifying the reserved locker 12 at step S230. The server 200 also notifies the depositor 300 of the information necessary to unlock the reserved locker 12.

The server 200 monitors whether a reserved locker 12 has become available. That is, the server 200 determines whether or not the reserved locker 12 becomes available in step S232. When a negative determination is made in step S232 (S232: NO), the server 200 repeats the processing of step S232. In a case in which a positive determination is made in step S232 (S232: YES), the server 200 proceeds to step S234. At step S234, the server 200 notifies the depositor 300 that the reserved locker 12 has become available. Then, the above-described steps S214 to S220 are executed.

Processing performed in a case in which the parcel is not picked up when the storage time limit approaches With reference to FIG. 3, a description will be given of a process in which the delivery locker management system notifies the recipient 400 before the storage time limit of the parcel arrives. As described above, in step S220, the recipient 400 is notified that the parcel is stored in the locker 12. In Step S300, the server 200 starts measuring the elapsed time from the time point at which the cargo is stored in the locker 12. The server 200 then proceeds to step S302.

In step S302, the server 200 determines whether the parcel has been picked up. When a positive determination is made in step S302 (S302: YES), the server 200 ends the present flow. When a negative determination is made in Step S302 (S302: NO), the server 200 proceeds to Step S304. In step S304, the server 200 determines whether or not the notification time has arrived. The notification time is a time point that is earlier than the storage time limit by a designated amount of time. The notification time is, for example, one day before the storage time limit. When a negative determination is made in step S304 (S304: NO), the server 200 returns to step S302. In a case in which a positive determination is made in step S304 (S304: YES), the server 200 proceeds to step S306. In step S306, the server 200 notifies the recipient 400 of a request to pick up the parcel.

Figure 3:
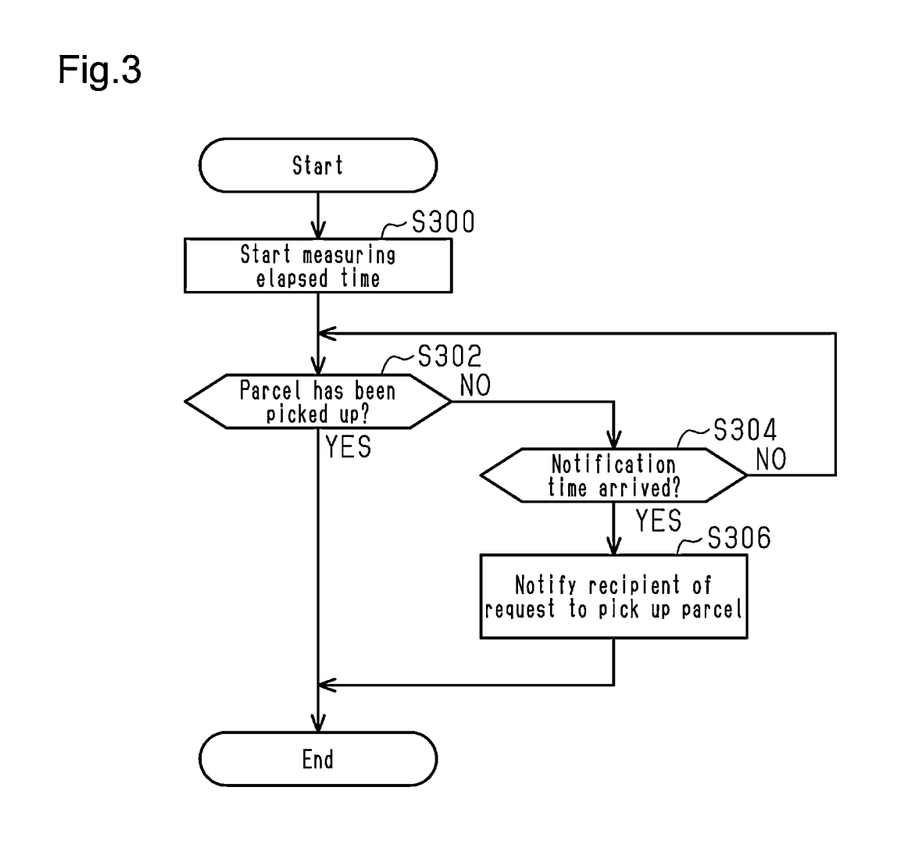
FIG. 3 is a flowchart showing a process in which the delivery locker management system shown in FIG. 1 notifies a recipient before a storage time limit of a parcel arrives.

As described above, according to the process illustrated in FIG. 3, the server 200 is configured to notify the recipient 400 of the parcel to prompt the recipient 400 of the parcel to pick up the parcel when the recipient 400 of the parcel has not picked up the parcel by a time point that is earlier than the storage time limit of the parcel by the designated amount of time.

Figure 4:
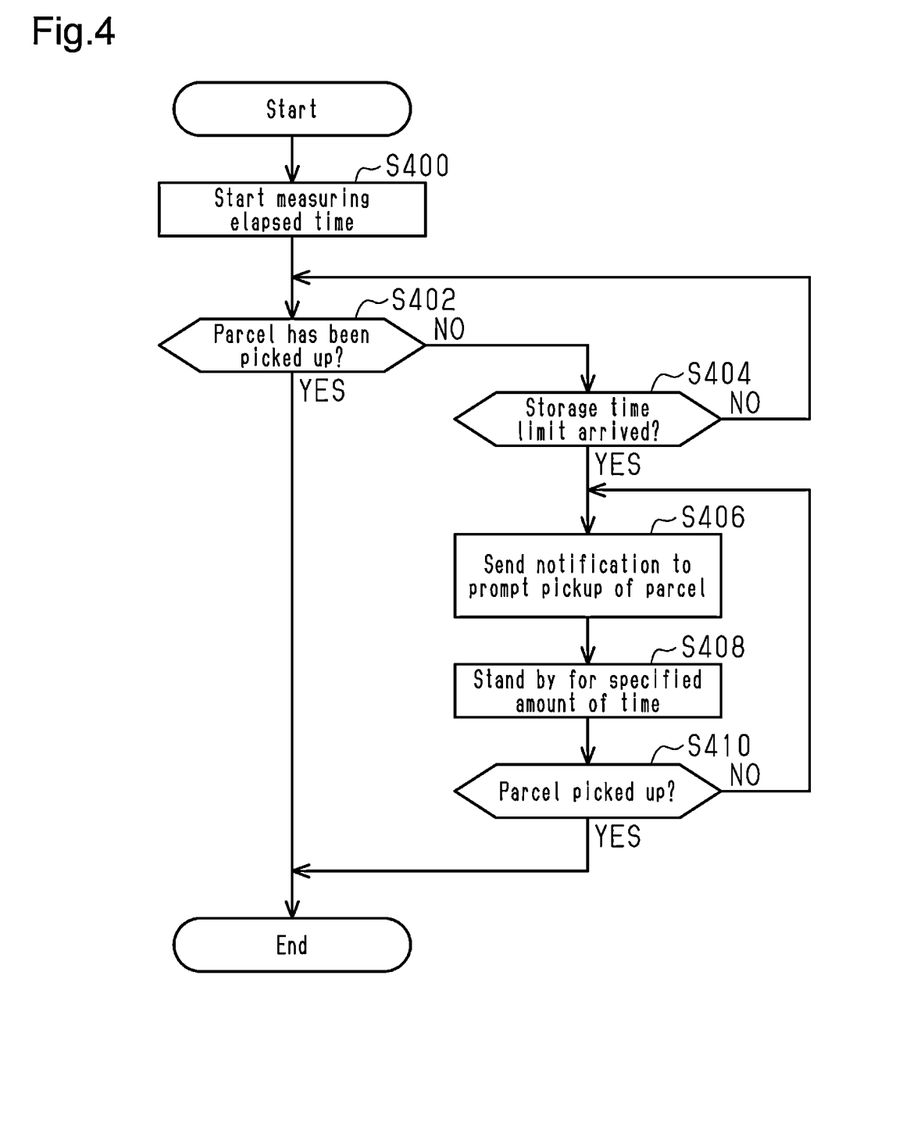
FIG. 4 is a flowchart showing a process in which the delivery locker management system shown in FIG. 1 issues a notification to a depositor to pick up the parcel after the storage time limit of the parcel has arrived.

Processing performed when the parcel is not picked up after the storage time limit has elapsed FIG. 4 shows a process in which the delivery locker management system shown in FIG. 1 notifies the depositor 300 of a request to take out the parcel after the storage time limit of the parcel has come. In Step S400, the server 200 starts measuring the elapsed time from the time point at which the cargo is stored in the locker 12. The server 200 then proceeds to step S402.

In step S402, the server 200 determines whether the parcel has been picked up. When a positive determination is made in step S402 (S402: YES), the server 200 ends the present flow. When a negative determination is made in Step S402 (S402: NO), the server 200 proceeds to Step S404. In step S404, the server 200 determines whether or not the storage time limit has come. When a negative determination is made in step S404 (S404: NO), the server 200 returns to step S402. In a case in which a positive determination is made in step S404 (S404: YES), the server 200 proceeds to step S406. In step S406, the server 200 notifies the depositor 300 to prompt the depositor to pick up the parcel. Then, the server 200 proceeds to step S408. The server 200 waits for a specified amount of time in step S408. For example, the specified amount of time is twenty-four hours. Then, the server 200 proceeds to step S410. In step S410, the server 200 determines whether the parcel has been picked up. When a negative determination is made in step S410 (S410: NO), the server 200 returns to step S406. When a positive determination is made in step S410 (S410: YES), the server 200 ends the present flow.

Action when the recipient 400 picks up the parcel before the storage deadline Referring to FIG. 5, a description will be given of an operation in a case in which the recipient 400 receives the parcel before the storage time limit comes.

First, depositor 300 transmits a request for use of delivery locker station 100 to server 200 (step S200). In response to this, the server 200 presents the extracted lockers 12 to 14 to the depositor 300 (step S206). The depositor 300 then sends the selection of locker 12 to the server 200 (step S208). In response to this, the server 200 notifies the depositor 300 of information specifying the allocated locker 12 (step S212).

Then, depositor 300 goes to delivery locker station 100. The depositor 300 requests the delivery locker station 100 to unlock the locker 12 (step S214). In response, the delivery locker station 100 notifies the depositor 300 that the locker 12 has been unlocked (step S216). Then, the depositor 300 requests the delivery locker station 100 to lock the locker 12 by closing the door of the locker 12. In response, the delivery locker station 100 notifies the depositor 300 that the locker 12 has been locked (step S218).

Next, the delivery locker station 100 notifies the server 200 that the parcel is stored and the locker 12 is locked. In response to this, the server 200 notifies the recipient 400 that the parcel has been deposited in the locker 12 (step S220).

Figure 5:
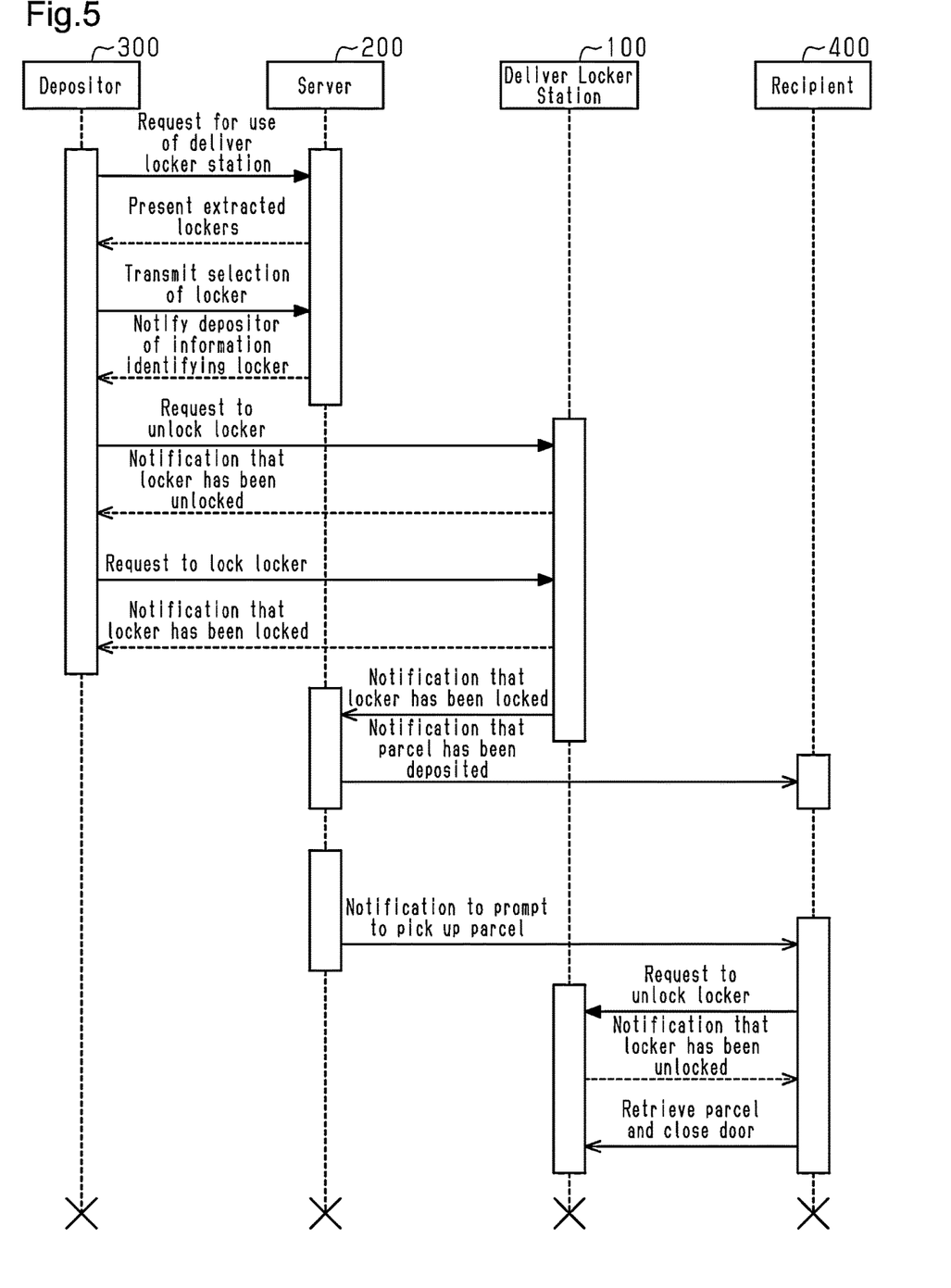
FIG. 5 is a sequence diagram showing a case in which the recipient picks up the parcel before the storage time limit arrives.

FIG. 5 shows a case in which the recipient 400 does not pick up the parcel before the notification time comes. The server 200 notifies the recipient 400 of a request to pick up the parcel (step S306). Next, the recipient 400 requests the delivery locker station 100 to unlock the locker 12. In response, the delivery locker station 100 notifies the recipient 400 that the locker 12 has been unlocked. The recipient 400 then removes the parcel and closes the door of the locker 12. Based on this, the delivery locker station 100 locks the locker 12.

Action when the recipient 400 does not pick up the parcel before the storage time limit Referring to FIG. 6, a description will be given of an operation in a case in which the recipient 400 does not pick up the parcel before the storage time limit comes.

First, depositor 300 transmits a request for use of delivery locker station 100 to server 200 (step S200). In response to this, the server 200 presents the extracted lockers 12 to 14 to the depositor 300 (step S206). The depositor 300 then sends the selection of locker 12 to the server 200 (step S208). In response to this, the server 200 notifies the depositor 300 of information specifying the allocated locker 12 (step S212).

Then, depositor 300 goes to delivery locker station 100. The depositor 300 requests the delivery locker station 100 to unlock the locker 12 (step S214). In response, the delivery locker station 100 notifies the depositor 300 that the locker 12 has been unlocked (step S216). Then, the depositor 300 requests the delivery locker station 100 to lock the locker 12 by closing the door of the locker 12. In response, the delivery locker station 100 notifies the depositor 300 that the locker 12 has been locked (step S218).

Next, the delivery locker station 100 notifies the server 200 that the parcel is stored and the locker 12 is locked. In response to this, the server 200 notifies the recipient 400 that the parcel has been deposited in the locker 12 (step S220).

As in the case described with reference to FIG. 5, when the notification time comes, the server 200 notifies the recipient 400 of a request to pick up the parcel (step S306). FIG. 6 shows an example in which the parcel has not been picked up before the storage time limit. First, before the storage time limit comes, the server 200 repeats the negative determination in step S402 and the negative determination in step S404. Immediately after the storage time limit comes, the server 200 makes a positive determination in step S404. For this reason, the server 200 notifies the depositor 300 of a request to pick up the parcel (step S406).

Figure 6:
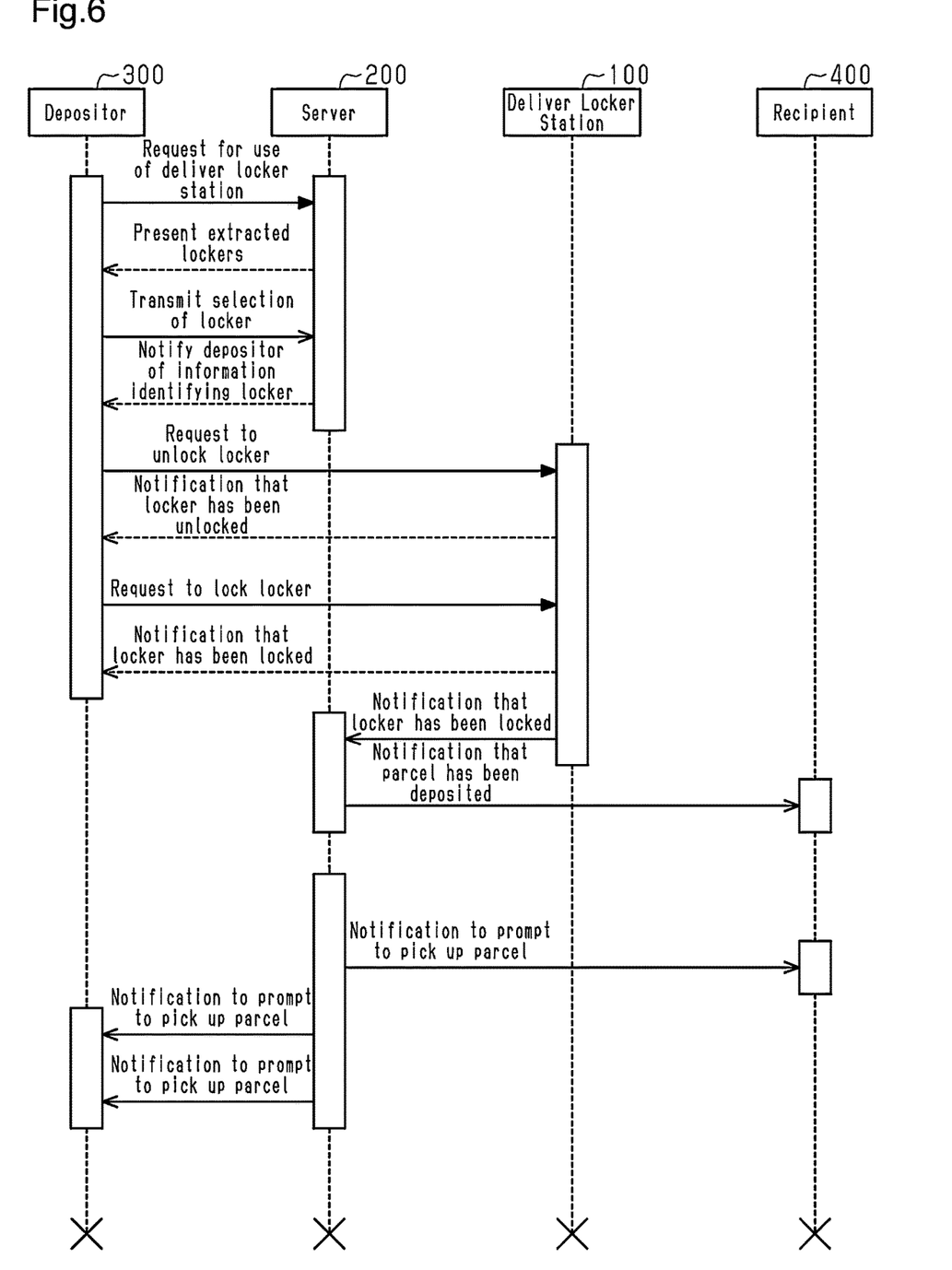
FIG. 6 is a sequence diagram showing a case in which the recipient does not pick up the parcel before the storage time limit arrives.

FIG. 6 illustrates an example in which the parcel is picked up before the specified amount of time elapses from the time point at which the server 200 performs the second notification to prompt the depositor 300 to pick up the parcel. First, the server 200 performs a first notification to prompt the depositor 300 to pick up a parcel, and then waits for the specified amount of time in step S408. The parcel has not been picked up at a time point when the specified amount of time has elapsed from a time point when the server 200 performs the first notification to prompt the depositor 300 to pick up the parcel. Therefore, the server 200 makes a negative determination in S410. Next, the server 200 performs a second notification to prompt the depositor 300 to pick up the parcel (step S406). After the second notification to prompt the depositor 300 to pick up the parcel, the server 200 stands by for the specified amount of time in step S408. Next, in step S410, the server 200 determines that the parcel has been picked up. Therefore, the server 200 ends the flow of FIG. 4.

Advantages of Present Embodiment (1) The delivery locker management system includes the delivery locker station 100 including the lockers 12 to 18 having two or more different sizes, and the server 200 configured to communicate with the delivery locker station 100. The server 200 is configured to obtain information on a size of a parcel to be deposited, extract the lockers 12 to 14 having sizes suitable for the parcel from available delivery lockers among the multiple lockers 12 to 18, allocate one locker 12 of the extracted lockers 12 to 14, and notify the depositor 300 of the parcel of information identifying the locker 12 allocated to the parcel. The computer 10 is configured to unlock the locker 12 allocated to the parcel, so that the depositor 300 can deposit the parcel in the locker 12 allocated to the parcel.

According to the above configuration, the locker 12 is allocated to the parcel based on the information on the size of the parcel to be deposited. For this reason, it is possible to prevent the parcel from being put into the large lockers 15 to 18 for storing a larger parcel even though the small lockers 12 to 14 capable of storing a parcel remain. Therefore, the operating rates of the lockers 12 to 18 are improved, and the convenience of the user is improved. For example, it becomes easy for the recipient 400 to receive a large parcel that can be accommodated only in the large lockers 17 and 18.

(2) The server 200 is configured to extract, as lockers 12 to 14 having suitable sizes, the smallest lockers 12 to 14 into which the parcel can be inserted from the available delivery lockers among the multiple lockers 12 to 18.

According to the above configuration, the smallest possible locker 12 to 14 is preferentially allocated to the load. Therefore, the operating rates of the lockers 12 to 18 can be increased.

(3) The server 200 is configured to issue a notification to the depositor 300 to prompt the depositor 300 to pick up the parcel when the storage time limit of the parcel arrives and the recipient 400 of the parcel has not picked up the parcel.

According to the above-described configuration, it is possible to prevent a situation in which parcel is left behind in the locker 12 from continuing for a long time. Accordingly, it is possible to suppress a situation in which the locker 12 cannot be used.

(4) The server 200 is configured to, after the depositor 300 deposits the parcel in the locker 12, notify the recipient 400 of the parcel that the parcel has been deposited in the delivery locker station 100.

According to the above-described configuration, it is possible to notify the recipient 400 that a parcel has reached the locker 12. This allows the recipient 400 to trigger the locker 12 to pick up the parcel.

(5) The server 200 is configured to notify the recipient 400 of the parcel to prompt the recipient 400 of the parcel to pick up the parcel when the recipient 400 of the parcel has not picked up the parcel by the time point that is earlier than the storage time limit of the parcel by the designated amount of time.

According to the above-described configuration, it is possible to prevent a situation in which parcel is left behind in the locker 12 from continuing for a long time. Accordingly, it is possible to suppress a situation in which the locker 12 cannot be used.

Modifications

The present embodiment may be modified as follows. The present embodiment and the following modifications can be combined as long as the combined modifications remain technically consistent with each other.

In the embodiment described above, one of the lockers 12 to 18 is allocated to the parcel of the depositor 300 before the depositor 300 goes to the delivery locker station 100. However, this is merely an example. For example, when depositor 300 visits delivery locker station 100, one of lockers 12 to 18 may be allocated to the parcel of depositor 300. According to the above-described embodiment, the smallest possible locker 12 to 14 is preferentially allocated to the load. Therefore, it is possible to suppress a situation a situation in which re-delivery is required due to the parcel accommodated in the small lockers 12 to 14 being put in the lockers 15 to 18. In other words, the load on the deliverer can be reduced.

In the embodiment described above, the depositor 300 selects the locker 12 in step S208. However, this is merely an example. For example, the server 200 may automatically allocate the locker 12 to the parcel without causing the depositor 300 to select the locker 12. In such a case, steps S206 and S208 may be omitted.

In the above-described embodiment, the server 200 is configured to extract, as the locker 12 to 14 having an appropriate size, the smallest one of the lockers 12 to 14 into which a parcel can be inserted from among the available lockers among the multiple lockers 12 to 18. However, this is merely an example. For example, the server 200 may extract the small lockers 12 to 14 and the medium lockers 15 and 16 as the lockers 12 to 16 having appropriate sizes with respect to the parcels accommodated in the small lockers 12 to 14.

For example, there may be situations where none of the small lockers 12-14 are available. The server 200 may allocate an available one of the medium lockers 15, 16 to the parcel that will fit in the small locker 12-14 in such a situation. One of the small lockers 12-14 may then become available before the depositor 300 deposits the parcel in the allocated one of the medium lockers 15, 16. In such a case, the server 200 may allocate an available one of the small lockers 12 to 14 to the parcel and may cancel one of the medium lockers 15 and 16 allocated to the parcel. In other words, after assigning a locker larger than the smallest locker in which the parcel can be placed to the parcel from among the available lockers of the multiple lockers 12 to 18, if the smallest locker in which the parcel can be placed becomes available before the parcel is deposited on the locker allocated to the parcel, the locker larger than the smallest locker in which the parcel can be placed may be cancelled and the smallest locker in which the parcel can be placed may be allocated to the parcel.

In the above-described embodiment, as shown in step S406 of FIG. 4, the server 200 notifies the depositor 300 to prompt the depositor to pick up the parcel. However, this is merely an example. For example, server 200 may notify the administrator of delivery locker station 100 to prompt the administrator to pick up the parcel. That is, the server 200 may be configured to issue a notification to the depositor 300 or the administrator of the delivery locker station 100 to prompt the depositor 300 or the administrator to pick up the parcel when a storage time limit of the parcel arrives and the recipient 400 of the parcel has not picked up the parcel.

Figure 2:
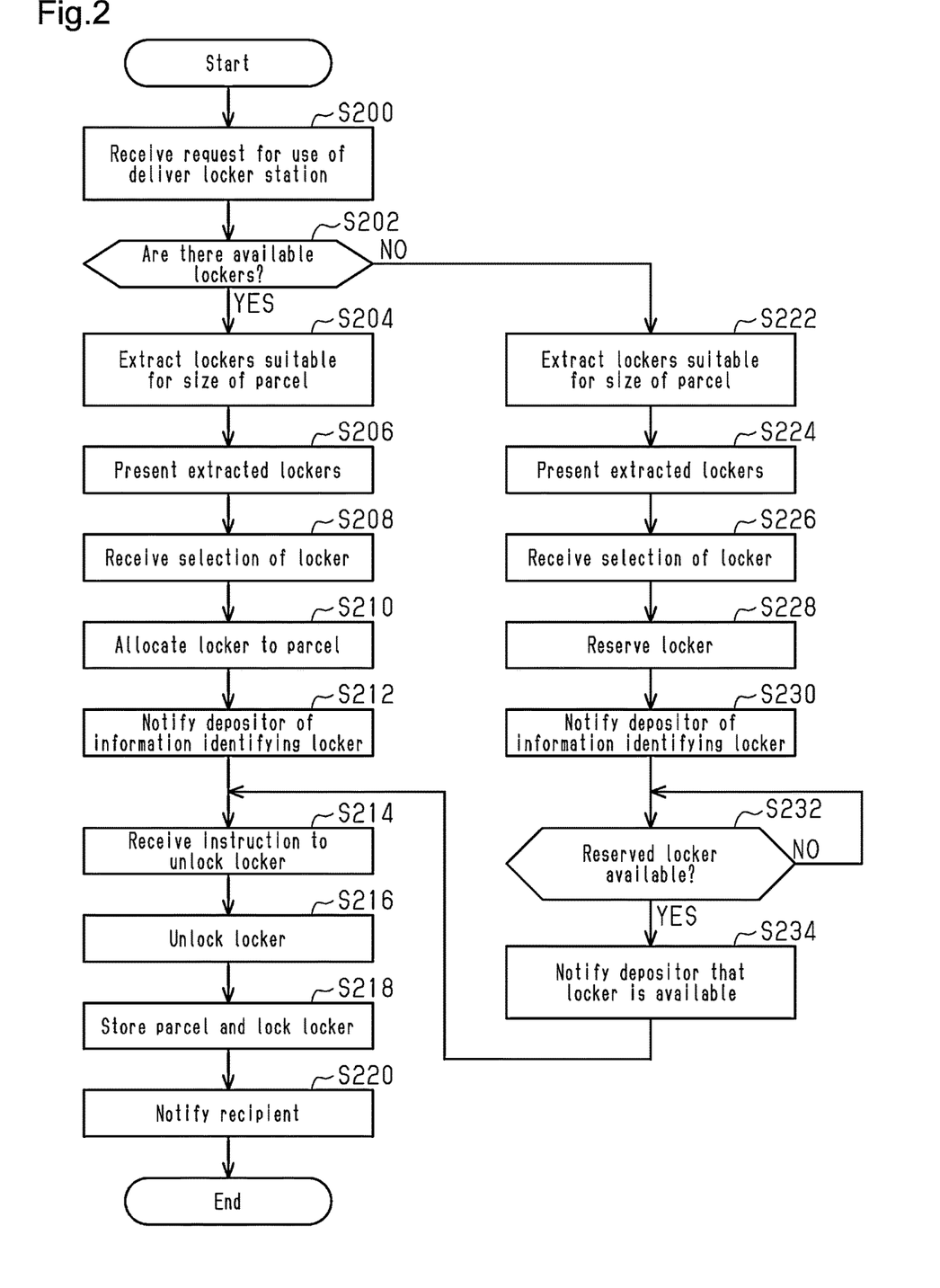
FIG. 2 is a flowchart showing a process executed by the delivery locker management system shown in FIG. 1.

Step S220 shown in FIG. 2 may be omitted.

Steps S222 to S234 shown in FIG. 2 may be omitted. In such a case, when there is no available locker (S202: NO), the server 200 may notify the depositor 300 that there is no available locker and complete the flow of FIG. 2.

The processing shown in FIG. 3 may be omitted.

The processing shown in FIG. 4 may be omitted.

In the above embodiment, the delivery locker station 100 and the server 200 communicate with each other via the network 500. For example, the delivery locker station 100 may have the function of the server 200 and the server 200 may be omitted.

In the above-described embodiment, each of the computer 10 and the server 200 includes a CPU, a RAM, and a ROM. Each of the computer 10 and the server 200 executes software processing. However, this is merely an example. For example, each of the computer 10 and the server 200 may include a dedicated hardware circuit (such as ASIC) that executes at least part of the software processes executed in the above-described embodiment. Specifically, each of the computer 10 and the server 200 may be modified as long as it has any one of the following configurations (a) to (c). (a) Each of the computer 10 and the server 200 includes a processor that executes all the processes according to programs and a program storage device such as a ROM that stores the programs. In other words, each of the computer 10 and the server 200 includes a software execution device. (b) Each of the computer 10 and the server 200 includes a processor that executes part of processes according to a program and a program storage. Each of the computer 10 and the server 200 further includes a dedicated hardware circuit that executes the remaining processes. (c) Each of the computer 10 and the server 200 includes a dedicated hardware circuit that executes all processes. Multiple software execution devices and/or multiple dedicated hardware circuits may be provided. In other words, the above processes may be executed by processing circuitry that includes at least one of a software processing device and a dedicated hardware circuit. The processing circuitry may include multiple software execution devices and multiple dedicated hardware circuits. The program storage device, or computer-readable medium, includes any type of storage device that is a medium accessible by a versatile computer or a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A delivery locker management system, comprising:
a delivery locker station including multiple delivery lockers having two or more different sizes; and
a processor configured to communicate with the delivery locker station, wherein
the processor is configured to:
obtain information on a size of a parcel to be deposited;
extract delivery lockers having sizes suitable for the parcel from available delivery lockers among the multiple delivery lockers;
allocate one of the extracted delivery lockers to the parcel prior to a depositor of the parcel arriving at the delivery locker station;
notify the depositor of the parcel of information identifying the delivery locker allocated to the parcel; and
unlock a lock of the delivery locker allocated to the parcel, so that the depositor can deposit the parcel in the delivery locker allocated to the parcel,
wherein, if the delivery locker allocated to the parcel is a delivery locker that is larger than a smallest delivery locker into which the parcel can be placed from among the multiple delivery lockers, and if the smallest delivery locker becomes available before the parcel is deposited in the larger delivery locker, the processor is further configured to cancel allocation of the larger delivery locker and allocate the smallest delivery locker to the parcel.

2. The delivery locker management system according to claim 1, wherein the processor is further configured to issue a notification to the depositor or an administrator of the delivery locker station to prompt the depositor or the administrator of the delivery locker station to pick up the parcel when a storage time limit of the parcel arrives and a recipient of the parcel has not picked up the parcel.

3. The delivery locker management system according to claim 1, wherein the processor is further configured to, after the depositor deposits the parcel in the delivery locker, notify a recipient of the parcel that the parcel has been deposited in the delivery locker station.

4. The delivery locker management system according to claim 1, wherein the processor is further configured to issue a notification to a recipient of the parcel to prompt the recipient to pick up the parcel if the recipient has not picked up the parcel by a time point that is earlier than a storage time limit by a designated amount of time.

5. The delivery locker management system according to claim 1, wherein, when a recipient of the parcel does not pick up the parcel before a storage time limit, the processor is further configured to perform a first notification to a depositor of the parcel to prompt the depositor to pick up the parcel, and if the parcel is not picked up within a specified amount of time after the first notification, perform a second notification to the depositor to prompt pickup of the parcel.

* * * * *